Oct. 3, 1939.   C. W. SINCLAIR   2,174,640
METHOD OF MAKING WHEELS
Filed Aug. 10, 1936   2 Sheets-Sheet 1

INVENTOR
CHARLES W. SINCLAIR
BY *Whittemore Hulbert Belknap*
ATTORNEYS

INVENTOR
CHARLES W. SINCLAIR

Patented Oct. 3, 1939

2,174,640

UNITED STATES PATENT OFFICE 2,174,640

METHOD OF MAKING WHEELS

Charles W. Sinclair, Detroit, Mich., assignor to Kelsey-Hayes Wheel Company, Detroit, Mich., a corporation of Delaware Application August 10, 1936, Serial No. 95,227

3 Claims. (Cl. 29—159.01)

The invention relates to the manufacture of wheels and refers more particularly to the manufacture of metal disc wheels.

The invention has for one of its objects to provide an improved method of and also an improved apparatus for making the wheel with the purpose in view of economically manufacturing the wheel. The invention has for another object to provide a method which does not require excessive power, especially during the final fashioning step.

These and other objects of the invention will become apparent from the following description, taken in connection with the accompanying drawings, in which Figure 1 is a plan view of the original blank;

In general, the disc wheel is formed from sheet metal strip stock which is cut to length, hooped and its ends welded, then cupped, and then flared to the final desired form.

Figure 1:
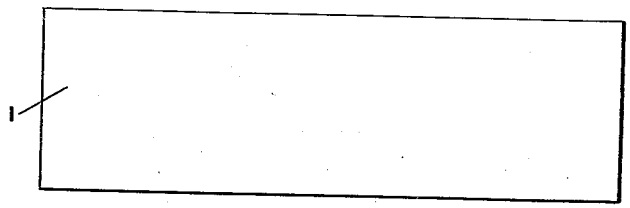
Figure 2:
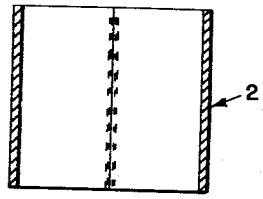
Figures 2, 3 and 4 are sections illustrating successive steps in the method.
Figure 3:
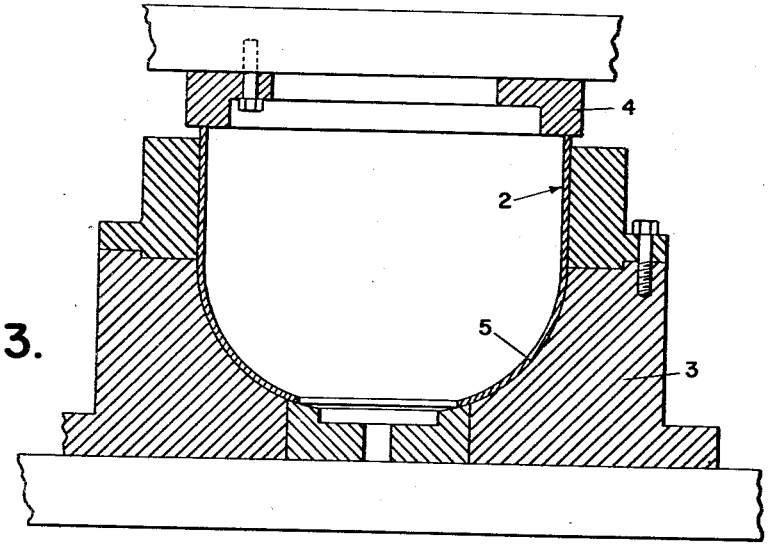
Figure 4:
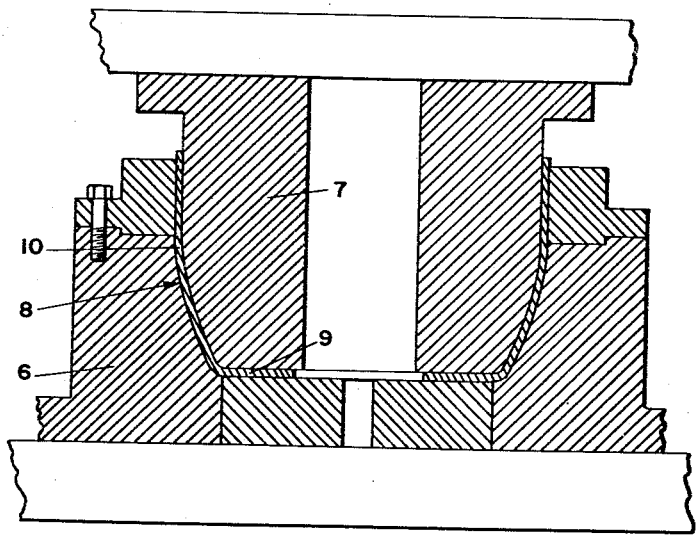

Figure 1 illustrates a sheet metal blank 1 cut to length. Figure 2 illustrates the cylindrical blank 2 which is formed by hooping the blank 1 and welding its ends. Figure 3 illustrates the first step in the cupping of the blank 2 by means of the die 3 and the ram 4 which turn in one end portion of the blank 2 to form the curved wall 5. Figure 4 illustrates the second step in the cupping, wherein dies 6 and 7 cooperate to flatten the free end portion of the curved wall 5 and thereby produce the completely cupped blank 8 having the flattened bottom 9 and the flange 10 with a curved portion flaring away from the flattened bottom and a cylindrical portion connecting into the curved portion.

Figure 5:
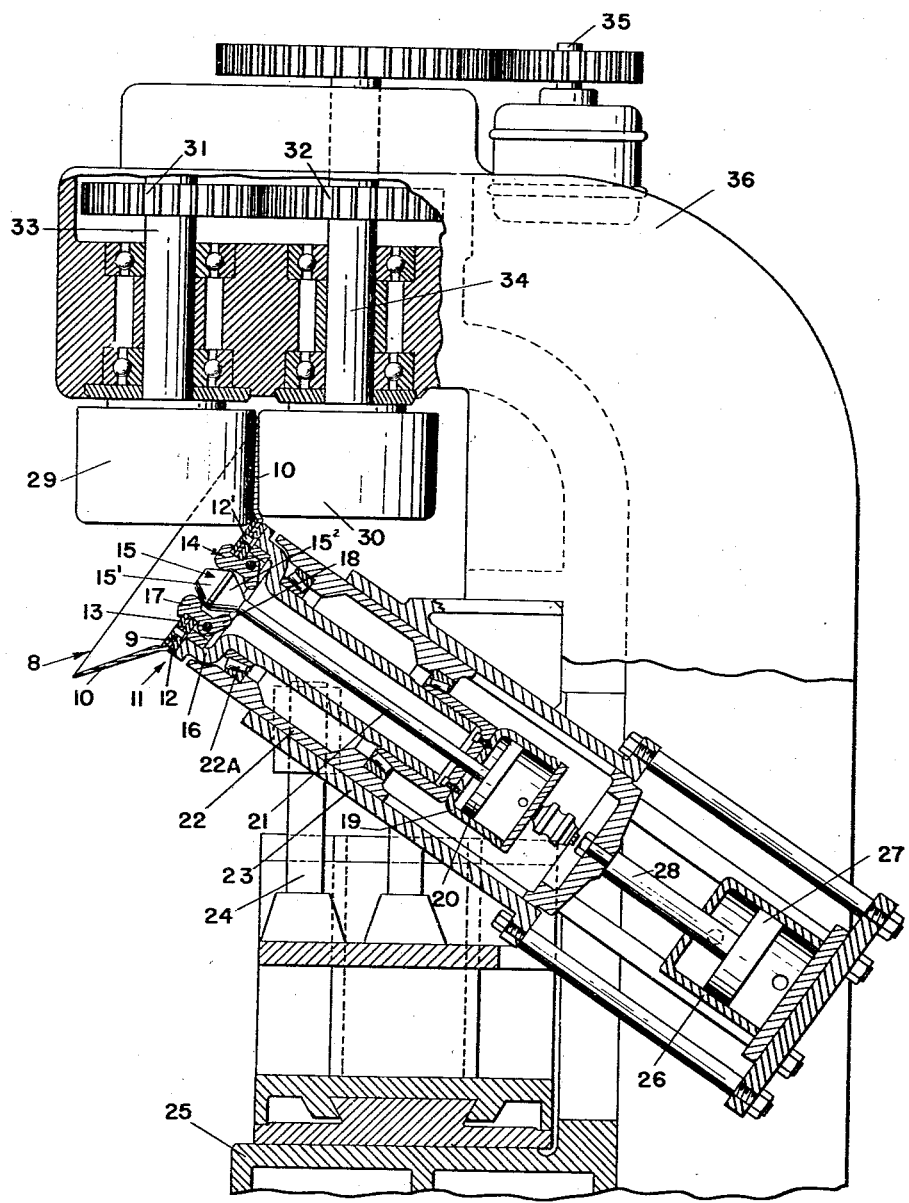
Figure 5 is a vertical section through the apparatus for carrying out the final step of my improved method.

The cupped blank 8 is then operated upon by the apparatus shown in Figure 5. This apparatus has the chuck 11 which comprises the plates 12 and 13 at opposite sides of the bottom 9 of the cupped blank and the rockable jaws 14 for clamping the plate 13 in position relative to the plate 12 and rigidly securing the bottom of the cupped blank therebetween. For moving the jaws, there is the cone member 15 which is reciprocable and which has different coned portions respectively engageable with the jaws to either clamp the plate 13 in place or release this plate. The plate 12 is fixedly carried upon the end of the support 16 and the jaws 14 are pivotally mounted upon this support inside the plate 12. These jaws have the outer and inner projections 17 and 18 respectively at opposite sides of their pivots which are engageable with the outer and inner coned portions 15' and 15² of the cone member 15, whereby the jaws may be rocked to either operative or inoperative positions upon reciprocation of the cone member. The support 16 carries at its inner end the cylinder 19 in which there is the piston 20 secured to the rod 21 having at its outer end the cone member. Suitable medium under pressure may be admitted to either end of the cylinder for actuating the piston. The support 16 is rotatably mounted upon the slide 22, but is held from longitudinal movement relative to the slide, suitable anti-friction roller bearings 22a being provided for this purpose. The slide is supported and guided by the guide 23, which is carried by the standards 24, which are adjustably mounted for vertical and horizontal movement upon the base 25. The guide 23 carries at its inner end the cylinder 26 within which is the piston 27 fixed to one end of the rod 28, the opposite end of this rod being fixed to the slide 22. A suitable medium under pressure may be admitted to either end of the cylinder 26 to thereby compel movement of the piston 27, rod 28 and slide 22 and consequently the support 16. The support 16, rod 21 and slide 22 are preferably concentric with respect to each other. The axes of these parts are inclined to the horizontal. The cylinder 26 and rod 28 also have their axes parallel to the axes of these parts.

29 and 30 are cooperating rolls which have their axes vertical and parallel. These rolls have a space or gap therebetween which progressively decreases axially in an upward direction, the maximum dimension of the effective portion of this space being preferably slightly less than the gauge of the flange 10 of the cupped blank 8. The outer roll 29 preferably has its lower end depend below the lower end of the roll 30. The rolls 29 and 30 are preferably positively driven as by means of the gears 31 and 32 respectively upon the shafts 33 and 34 of the rolls. The gear 32 may be driven by suitable means which, as shown, comprises gearing between the roll shaft 34 and the drive shaft 35. The shafts 33 and 34 are journaled on the arm 36 of the apparatus.

If desired, the clutch plate 12 may be provided with the dowels 12' for engaging holes formed in the bottom 9 of the blank, thereby assuring rotation of the support 16 and the chuck 11 with the blank.

When the cupped member 8 is clamped to the support 16 by the chuck 11, the axis of this cupped member is inclined relative to the axes of the rolls 29 and 30. At the same time, the guide 23 may be vertically and horizontally adjusted so that the uppermost portion of the flange 10 will substantially register with the space or gap between the rolls. Also the relative inclination of the axis of the cupped blank and the axes of the rolls is such that as the cupped blank is fed outward the flange 10 progressively passes between the rolls 29 and 30 from its free edge toward the bottom of the cupped blank so that this flange is progressively flared. It will be seen that at the same time the rolls roll opposite sides of the flare in progressively increasing extents from its free edge and decrease its gauge toward its free edge. The disc wheel upon completion of this step then has the contour and cross sectional shape as shown in full lines in Figure 5. After the disc wheel has been formed, it may be removed by lowering the guide 23 during rotation of the rolls 29 and 30 and by then releasing the chuck 11.

What I claim as my invention is:

1. The method of making a wheel, comprising forming a cupped metal blank, clamping the bottom of the cupped blank and relatively advancing the cupped blank and a pair of spaced rolls toward each other with the axis of the cupped blank inclined to the axes of the rolls and the free edge of the cupped blank in substantial registration with the gap between the rolls, and during the relative advancement rolling the flange throughout its peripheral extent.

2. Those steps in the method of forming a wheel which consist in fashioning a cupped metal blank, progressively flaring the flange of the cupped blank by relatively advancing the cupped blank and a pair of spaced rolls toward each other with the axis of the cupped blank inclined to the axes of the rolls and with the free edge of the cupped blank in substantial registration with the gap between the rolls, and clamping the bottom of the cupped blank during the flaring operation to maintain said bottom substantially normal to the axis of the blank.

3. Those steps in the method of making a wheel which consist in forming a tube like blank into a cupped blank with a curled bottom, flattening the bottom, progressively flaring the flange of the cupped blank by relatively advancing the cupped blank and a pair of spaced rolls toward each other with the axis of the cupped blank inclined to the axes of the rolls and with the free edge in substantial registration with the gap between the rolls, and at the same time rolling opposite sides of the flare to progressively increasing extents from its free edge to thereby decrease the gauge of the flare toward its free edge.

CHARLES W. SINCLAIR.